United States Patent [19]

Yamamoto et al.

[11] 4,187,133
[45] Feb. 5, 1980

[54] METHOD FOR MANUFACTURING A CLUTCH FACING

[75] Inventors: Yasunobu Yamamoto, Chiryu; Ryoichi Tomikawa; Toshiaki Sakabe, both of Toyota; Yasuhiro Matsumoto, Toyoake, all of Japan

[73] Assignee: Aisin Seiki Kabushiki Kaisha, Kariya, Japan

[21] Appl. No.: 826,132

[22] Filed: Aug. 19, 1977

[30] Foreign Application Priority Data

Aug. 26, 1976 [JP] Japan ............................... 51-102054

[51] Int. Cl.² .......................... B32B 5/00; F16D 69/02
[52] U.S. Cl. .............................. 156/166; 188/251 A; 192/107 M; 427/401; 428/443
[58] Field of Search ............... 427/401, 430 B, 430 R, 427/434 D, 385 C; 192/107 M; 188/251 A, 251 R; 428/443, 271, 375; 156/173, 175, 166, 169; 106/36

[56] References Cited

U.S. PATENT DOCUMENTS

| 2,045,452 | 6/1936 | Emrick | 106/36 |
| 2,077,669 | 4/1937 | Bruce | 192/107 M |
| 2,146,518 | 2/1939 | Whitelaw | 192/107 M |
| 2,277,602 | 3/1942 | Novak | 192/107 M |
| 2,640,795 | 6/1953 | Betolet | 192/107 M |
| 2,702,770 | 2/1955 | Steck | 192/107 M |
| 3,344,094 | 9/1967 | deGaugue | 188/251 A |
| 3,365,041 | 1/1968 | Stromfeltz | 192/107 M |
| 3,429,766 | 2/1969 | Stromfeltz | 428/443 |
| 3,520,390 | 7/1970 | Bentz | 192/107 M |
| 3,526,306 | 9/1970 | Bentz et al. | 188/251 A |
| 3,600,258 | 8/1971 | Morton | 428/443 |
| 3,655,609 | 4/1972 | Evans et al. | 192/107 M |
| 3,713,934 | 1/1973 | Morton | 428/443 |
| 3,856,120 | 12/1974 | Kwdek et al. | 188/251 A |

Primary Examiner—Ronald H. Smith
Assistant Examiner—Sadie L. Childs
Attorney, Agent, or Firm—Oblon, Fisher, Spivak, McClelland & Maier

[57] ABSTRACT

A method of manufacturing a clutch facing including the steps of mixing graphite and phenolic resin to form a graphite mixture, soaking an asbestos fiber string within the mixture, removing the soaked string such that phenolic resin content of between 14-24 weight percents and graphite content of between 1-8 weight percents for every 100 weight percents is produced and bonding the string to the clutch facing such that the Rockwell hardness of the clutch facing is between 20-60 on the Moh scale.

6 Claims, No Drawings

METHOD FOR MANUFACTURING A CLUTCH FACING

BACKGROUND OF THE INVENTION

1. Field of the Invention

This invention relates to an improved clutch facing, and more particularly to a method for manufacturing a clutch facing of the type used for automobiles and the like.

2. Description of the Prior Art

Clutch facings are usually made of an inorganic fiber-based friction material which include many different types. Recently, the clutch facing used for automobiles and the like is made by a so-called spiral woven system because the clutch facing made by this system is preferable with respect to performance or durability.

The important qualities in a clutch facing are durability against wear, a desirable friction coefficient, high resistance against shudder and so on, but it is well known that the durability against wear is inconsistent with resistance against shudder. Therefore, a problem exists in clutch facings with regard to needed offsetting of these contradictory properties. The term "durability against wear" means durability determined by the rate of wear, and the term "resistance against shudder" refers to vibration of a vehicle body caused when the vehicle starts and may be demonstrated by acceleration G of the vehicle.

Conventional clutch facings produced by the spiral woven system are, as will be explained hereinbelow, obtained through various processes including mixing relatively long asbestos fiber with lubricant, organic fiber and so on, then making an asbestos fiber string with a fine brass core, soaking the asbestos in a binder agent such as thermosetting phenolic resin, forming the asbestos fiber string into a loop shape under pressure, then heating the loop-shaped string so as to cure perfectly and finally smoothing the surface of loop-shaped string with a grinding machine, thereby obtaining the complete clutch facing. Upon forming under pressure, a plurality of radial slits are provided on the friction surface of some clutch facings. The effect of such slits is to improve the engagement of the flywheel or pressure plate by the clutch facing and the adhesion thereto upon clutch releasing.

Contradiction in two properties as mentioned above is caused by the rate of a binder agent for the asbestos fiber string, that is, the rate of the resin such as phenolic resin and harness of the clutch facing after pressure forming. Namely, as well known, the higher the rate of the resin or the hardness is, the better the durability against wear is, while the resistance against shudder becomes progressively worse. The clutch facings of a high rate of resin and a high degree of hardness are being supplied in the market for use with a result of insufficient resistance against shudder. The term "high hardness" or "low hardness" means a Rockwell hardness on the Moh scale (HRM), with the former term meaning hardness of a range greater than 60 the latter meaning a hardness of a range less than 60. The term "high rate of resin" means that the rate of the binder agent is more than 25 weight percent for every 100 weight percent asbestos fiber string. The term "low rate of resin" means that the rate of the binder agent is 14-24 weight percents for every 100 weight percent of asbestos fiber string.

SUMMARY OF THE INVENTION

Accordingly, it is an object of the present invention to provide a clutch facing produced by the spiral woven system wherein the contradictory properties as mentioned above are effectively improved.

Various other objects, features and attendant advantages of the present invention will be more fully appreciated as the same becomes better understood from the following detailed description.

DETAILED EXPLANATION OF THE INVENTION

According to the present inention, the clutch facing processed by the spiral woven system is, as will be explained hereinbelow, obtained by the combination of low rate resin and low hardness. More specifically, asbestos fiber string is soaked in a binder agent such as phenolic thermosetting resin of 14-24 weight percents and graphite of 1-8 weight percents for every 100 weight percent of asbestos fiber string, and is formed into a loop shape under pressure so as to result in a hardness of 20-60HRM and subsequently formed or bonded to a clutch facing. A plurality of radial slits may be provided on the friction surface so as to improve the degree of engagement or of adhesion as in the conventional facing.

The theory of the present invention is as follows: the graphite is used to improve the poor durability against wear caused by the lower rate of resin and the lower hardness, thereby resulting in a clutch facing in which these two contradictory properties are improved. According to the present invention the graphite is soaked in a solvent along with a thermosetting phenolic resin The term "thermosetting phenolic resin" means straight phenolic resin of resol type or novolak type, modified phenolic resin as modified by polyamide resin, epoxy resin, melamine resin, drying oil and so on, and resin obtained by condensation of bisphenol A and formaldehyde or bisphenol A and furfural. A curing agent such as a hexamethylenetetramine may be mixed in a phenolic resin when desired.

This invention will be more fully understood from the following specific examples. In the examples, all percents are by weight.

EXAMPLE 1

Graphite of 20 percent was mixed in the varnish of resol resin of 100 percent of nonvolatile parts for every 100 weight percents of asbestos fiber string with a ball mill and graphite mixture A was produced. This graphite mixture A was controlled i.e. prepared in, by a solvent until 20 percent solid suspension was obtained in which the conventional asbestos fiber strings of long fibers was soaked. Then the string was taken out and dried at a temperature of 130° C. for 10 minutes to make the soaked string A. In the soaked asbestos fiber string A, the graphite content was 3 percent, and the varnish of the resol resin content was 16 percent. The soaked string A was made into a loop shape with a roll machine, applied with a pressure of 30 kg/cm and a temperature of 150° C. for 5 minutes, and heated at 150° C. for 12 hours. Then it was cooled and smoothed to obtain a clutch facing. The hardness thereof was 21 HRM.

EXAMPLE 2

In example 2, graphite of 25 percent was mixed in with varnish of the resol resin of 100 percent of nonvolatile parts for every 100 weight percents of asbestos fiber string with a ball mill and the graphite mixture B was thus produced and was controlled by a solvent until 25 percent solid suspension was obtained. Then the complete clutch facing was formed in the same manner as that of the example 1. In the soaked asbestos fiber string B, the graphite content was 5 percent and the varnish of the resol resin content was 19 percent. The hardness thereof was 38 HRM.

EXAMPLE 3

In example 3, graphite of 35 percent was mixed in the varnish of the resol resin 100 percent for nonvolatile parts for every 100 percent of asbestos fiber string with a ball mill and graphite mixture C was produced. This graphite mixture C was controlled by a solvent until 30 percent solid suspension was obtained. Then the complete clutch facing was formed in the same manner as that of example 1. In the soaked asbestos fiber string C, the graphite content was 7 percent and the varnish of the resol resin content was 22 percent. The hardness thereof was 58 HRM.

EXAMPLE 4

As per example 3, graphite mixture C was controlled by a solvent until 22 percent solid suspension was obtained in which the conventional asbestos fiber strings of long fibers were soaked. Then, the string was taken out and dried at a temperature of 130° C. for 10 minutes to make soaked string D. In soaked asbestos fiber string D, the graphite content was 5 percent and the varnish of the resol resin content was 16 percent. Soaked string D was made into a loop shape with a roll machine, applied with pressure of 60 kg/cm$^2$ and a temperature of 160° C. for 5 minutes, and heated at 150° C. for 12 hours. Then it was cooled and smoothed to obtain the clutch facing. The hardness thereof was 60 HRM.

EXAMPLE 5

Graphite of 23 percent was mixed in the varnish of the resol resin of 100 percent for nonvalatile parts for every 100 percent of asbestos fiber string with a ball mill and graphite mixture E was produced. This graphite mixture E was controlled by a solvent until 29 percent solid suspension was obtained in which the conventional asbestos fiber string of long fibers was soaked. Then the string was taken out and dried with at a temperature of 130° C. for 10 minutes to make the soaked string E. In the soaked asbestos fiber string E, the graphite content was 5 percent, and the varnish of the resol resin content was 22 percent. Soaked string E was made into a loop shape with a roll machine, applied with pressure of 60 kg/cm$^2$ and a temperature of 150° C. for 5 minutes, and heated at 150° C. for 10 hours. Then it was cooled and smoothed to get the clutch facing. The hardness thereof was 23 HRM.

EXAMPLE 6

The varnish of a melamine-resol resin was substituted for the resol resin of example 2 to thereby produce an asbestos fiber string F. Then the complete clutch facing was formed in the same manner of example 2. In the soaked asbestos fiber string F, the graphite content was 5 percent and the varnish of the melamine-resol resin content was 19 percent. The hardness thereof was 39 HRM.

EXAMPLE 7

The varnish of novolak resin mixed with hexamethylenetetramine as a curing agent was substituted for the resol resin of example 2 to thereby produce an asbestos fiber string G. Then the complete clutch facing was formed in the same manner as that of example 2. In the soaked asbestos fiber string G, the graphite content was 5 percent and the varnish of the novolak resin content was 19 percent. The hardness thereof was 37 HRM.

COMPARISON EXAMPLE 1

In comparison with example 2, an asbestos fiber string H was obtained only with the resol resin and without the use of the graphite. Then the complete clutch facing was formed in the same manner as that of example 2. In the soaked asbestos fiber string H, the resol resin content was 19 percent. The hardness thereof was 37 HRM.

COMPARISON EXAMPLE 2

Here, the varnish of the resol resin was controlled by a solvent until 30 percent solid suspension was obtained in which the conventional asbestos fiber string of long fibers were soaked. Then, the string was taken out and dried at a temperature of 130° C. for 10 minutes to make the soaked string I. In the soaked asbestos fiber string I, the varnish of the resol resin content was 36 percent. The soaked string I was made into a loop shape with a roll machine, applied with a pressure of 200 kg/cm$^2$ and a temperature of 170° C. for 5 minutes, and heated at 170° C. for 10 hours. Then it was cooled and smoothed to obtain the clutch facing. The hardness thereof was 84 HRM.

COMPARISON EXAMPLE 3

In comparison with example 2, the graphite mixture B was here controlled by a solvent until 38 percent solid suspension was obtained and the soaked asbestos fiber string J was produced. Then the complete clutch facing was formed in the same manner as that of example 2. In the soaked asbestos fiber string J, the graphite content was 10 percent and the varnish of the resol resin content was 36 percent were soaked. The hardness thereof was 90 HRM.

The following tables 1 and 2 show the qualities of the clutch facing which resulted from the above examples 1-7 and comparative examples 1-3, respectively.

TABLE 1

|  | Example 1 | Example 2 | Example 3 | Example 4 |
|---|---|---|---|---|
| amount of phenolic resin (weight %) | 16 | 19 | 22 | 16 |
| amount of graphite (weight %) | 3 | 5 | 7 | 5 |
| Rockwell hardness (Moh scale) | 21 | 38 | 58 | 60 |
| pressure for press-forming (kg/cm$^2$) | 30 | 30 | 30 | 60 |
| resistance against shudder (G) | 0.090 | 0.095 | 0.100 | 0.100 |
| friction coefficient of stable period ($\mu$) | 0.38 | 0.35 | 0.33 | 0.35 |
| rate of wear ($\times 10^{-8}$ mm/kg m) | 6.00 | 5.50 | 4.80 | 5.80 |

TABLE 1-continued

|  | Example 5 | Example 6 | Example 7 |
|---|---|---|---|
| amount of phenolic resin (weight %) | 22 | 19 | 19 |
| amount of graphite (weight %) | 5 | 5 | 5 |
| Rockwell hardness (Moh scale) | 23 | 39 | 37 |
| pressure for press-forming (kg/cm$^2$) | 15 | 30 | 30 |
| resistance against shudder (G) | 0.095 | 0.095 | 0.100 |
| friction coefficient of stable period ($\mu$) | 0.35 | 0.36 | 0.33 |
| rate of wear ($\times 10^{-8mm}$/kg m) | 5.90 | 5.70 | 5.80 |

TABLE 2

|  | Comparison Example 1 | Comparison Example 2 | Comparison Example 3 |
|---|---|---|---|
| amount of phenolic resin (weight %) | 19 | 36 | 36 |
| amount of graphite (weight %) | 0 | 0 | 10 |
| Rockwell hardness (Moh scale) | 37 | 84 | 90 |
| pressure for press-forming (kg/cm$^2$) | 30 | 200 | 200 |
| resistance against shudder (G) | 0.105 | 0.200 | 0.200 |
| friction coefficient of stable period ($\mu$) | 0.35 | 0.25 | 0.28 |
| rate of wear ($10^{-8mm}$/kg m) | 7.50 | 6.00 | 4.50 |

A detector of shudder (a gange of an acceleration) was fitted on a floor of the automobile to measure the vibration generated on the body of the automobile and recorded the maximum value thereof when the automobile starts with the semi-clutch condition. The average of the maximum values from 200 tests is shown in the Tables. In the evaluation shown in Tables 1 and 2, a value less than 0.100 G is considered to be excellent, 0.100–0.120 G to be good, and above 0.120 G to be poor. The value of the friction coefficient is measured by a dynamometer of a full size machine at 200° C. on the frictional surface and is considered to be excellent from 0.30 to 0.40. The value of the rate of wear is measured by a dynamometer of a full size machine at 200° C. on the frictional surface and is considered to be excellent under a value of $6.00 \times 10^{-8mm}$/kg m.

Obviously, many modifications and variations of the present invention are possible in light of the above teachings. It is understood that within the scope of the appended claims, the invention may be practiced otherwise than as specifically described herein.

What is claimed as new and desired to be secured by Letters Patent of the United States is:

1. A method of manufacturing a clutch facing, comprising:
   mixing graphite and phenolic resin to form a graphite mixture;
   soaking an asbestos fiber string within said graphite mixture;
   producing a soaked asbestos fiber string comprising a phenolic resin content of 14–24 weight percents and graphite content of 1–8 weight percents for every 100 weight percent of said soaked asbestos fiber string; and
   bonding said soaked asbestos fiber string to said clutch facing wherein the Rockwell hardness of said clutch facing is between 20–60 on the Moh scale.

2. A method as claimed in claim 1, wherein said step of bonding said string to said clutch facing includes forming said string into a loop shape.

3. A method as claimed in claim 1, wherein said phenolic resin comprises thermosetting resol resin.

4. A method as claimed in claim 1, wherein said phenolic resin comprises thermo novolak resin and wherein a curing agent is added thereto.

5. A method as claimed in claim 1, further comprising the step of preparing said graphite mixture in a solvent prior to said step of producing said soaked asbestos fiber string.

6. A method as claimed in claim 1, wherein said graphite mixture consists essentially of graphite and phenolic resin.

* * * * *